United States Patent
Mueller

(10) Patent No.: US 10,057,793 B2
(45) Date of Patent: Aug. 21, 2018

(54) DATA COMMUNICATIONS NETWORK FOR AN AIRCRAFT

(71) Applicant: Airbus Operations GmbH, Hamburg (DE)

(72) Inventor: Jan Mueller, Hamburg (DE)

(73) Assignee: Airbus Operations GmbH (DE)

( * ) Notice: Subject to any disclaimer, the term of this patent is extended or adjusted under 35 U.S.C. 154(b) by 168 days.

(21) Appl. No.: 14/940,438

(22) Filed: Nov. 13, 2015

(65) Prior Publication Data

US 2016/0157111 A1 Jun. 2, 2016

(30) Foreign Application Priority Data

Nov. 28, 2014 (EP) ...................................... 14195496

(51) Int. Cl.
*H04W 24/04* (2009.01)
*H04B 7/185* (2006.01)

(52) U.S. Cl.
CPC ........ *H04W 24/04* (2013.01); *H04B 7/18506* (2013.01)

(58) Field of Classification Search
None
See application file for complete search history.

(56) References Cited

U.S. PATENT DOCUMENTS

| | | | | |
|---|---|---|---|---|
| 6,202,566 B1 * | 3/2001 | Hutchinson | ............. | B61B 15/00 104/118 |
| 8,493,906 B1 * | 7/2013 | Troxel | ............... | H04B 7/18506 370/316 |
| 2004/0031882 A1 * | 2/2004 | Wagner | ................ | B60N 2/0224 244/118.6 |
| 2007/0127460 A1 * | 6/2007 | Wilber | .................. | H04L 49/602 370/389 |
| 2011/0299470 A1 * | 12/2011 | Muller | ..................... | H04Q 9/00 370/328 |
| 2011/0301770 A1 * | 12/2011 | Rutman | ................ | B60L 11/182 700/292 |
| 2013/0161971 A1 * | 6/2013 | Bugno | ....................... | B60J 3/04 296/97.2 |

(Continued)

FOREIGN PATENT DOCUMENTS

| | | |
|---|---|---|
| DE | 102009009189 A1 | 8/2010 |
| DE | 102011114957 A1 | 4/2013 |

OTHER PUBLICATIONS

Communication—Extended European Search Report (dated May 19, 2015) (EP14195496).

*Primary Examiner* — Ayaz Sheikh
*Assistant Examiner* — Faiyazkhan Ghafoerkhan
(74) *Attorney, Agent, or Firm* — Lerner, David, Littenberg, Krumholz & Mentlik, LLP

(57) ABSTRACT

A data communications network for an aircraft includes a first branch for establishing a wireless data connection to a first group of end devices, a primary control unit connected to the first branch, and a backup control unit connected to the first branch. The primary control unit is configured for data transmission to and from the first group of end devices via the first branch. The backup control unit is configured for detecting an operating state of the primary control unit and for taking over data transmission to and from the first group of end devices via the first branch from the primary control unit in case of a failure of the primary control unit.

11 Claims, 3 Drawing Sheets

(56) References Cited

U.S. PATENT DOCUMENTS

2013/0318272 A1* 11/2013 Bird ............... H04H 20/62
710/303
2014/0309811 A1* 10/2014 Mueller ........... B64D 25/00
701/2

* cited by examiner

DATA COMMUNICATIONS NETWORK FOR AN AIRCRAFT

FIELD OF THE INVENTION

The description relates to a data communications network for an aircraft, a data communications system with such a data communications network and an aircraft with a data communications system.

BACKGROUND OF THE INVENTION

Sensors and actuators in an aircraft are used to detect physical measuring variables and to control systems or functions of functional elements. Based on detected measuring variables, conclusions can be drawn about the state of an aircraft system component or of the environment and exterior or interior of the aircraft. These sensors are hooked up to a power supply and evaluator by means of corresponding electrical lines. In light of weight restrictions in aircraft construction along with the complexity of necessary electrical cabling for a sensor network, sensors may be used only very sparingly, and just in places where essential.

In an aircraft, components, systems, and functions are usually analysed on fault resistance. Fault resistance analysis means that the effect or impact of a fault of one element on neighbouring elements or on higher level systems is analysed and assessed on a scale of criticality.

DE 10 2009 009 189 A1 describes sensors and a sensor network for an aircraft. The sensors are configured for wireless transmission of data to the sensor network.

DE 10 2011 114 957 A1 describes a wireless network for controlling an oxygen system in an aircraft.

BRIEF SUMMARY

There may be a need to reduce the failure probability of a data communications network in an aircraft.

According to an aspect, a data communications network for an aircraft is provided. The data communications network comprises a first branch for establishing a wireless data connection to a first group of end devices, a primary control unit connected to the first branch, and a backup control unit connected to the first branch. The primary control unit is configured for data transmission to and from the first group of end devices via the first branch. The backup control unit is configured for detecting an operating state of the primary control unit and for taking over data transmission to and from the first group of end devices via the first branch from the primary control unit in case of a failure of the primary control unit.

The first branch may particularly be a wired connection from the primary control unit to one or more connection devices which are adapted for establishing a wireless connection with the end devices. The end devices may be sensors and/or actuators in an aircraft which are configured for sending and receiving data to and from a central control unit, namely the primary control unit. Sensors may for example be temperature sensors for detecting the temperature in a passenger cabin or of components arranged in the aircraft. Other sensors may be sensors which detect status information of aircraft components like for example doors (open/closed) or flaps. Actuators may be a releasing mechanism of oxygen masks, a window shading element which mechanically moves a cover element to cover windows of the passenger cabin, or illuminating elements.

The primary control unit receives data from the sensors and evaluates it. Additionally, for example based on the evaluated sensor data, the primary control unit sends commands to an actuator, for example to a ventilation unit or an air conditioner located in the cabin of the aircraft.

Wireless networks provide flexibility relating to the positioning of end devices. In a wireless data communications network, the end devices may be relocated without having to costly and time-consuming place a wired connection to the new location of the relocated sensors. It has been recognised that in such a configuration, the fault resistance of the data communications network may be increased or the failure probability of the data communications network may be reduced if a backup control unit is provided which monitors or checks the operation status of the primary control unit and takes over the function of the primary control unit in the data communications network in case of a failure of the primary control unit.

The primary control unit may be a wireless control unit which is configured for managing the data communications network and the data transmission to and from the end devices and/or between the end devices. The backup control unit is configured to take the position of the primary control unit in case of a failure of the primary control unit such that the data communications network performs its task as if the primary control unit was still available. In other words, the backup control unit copies the primary control unit, wherein the backup control unit is configured for monitoring or observing if the primary control unit is available and performs its task correctly. The primary control unit may be configured for sending a frequent so called heart beat signal to the backup control unit in order to indicate that the primary control unit is performing its tasks properly.

Such a data communications network has a reduced failure probability as the backup control unit constitutes a fallback position or fallback configuration of the data communications network.

The primary control unit and the backup control unit may both be arranged in the same housing or they may be spaced apart from each other. In an aircraft, the primary and backup control unit may for example be located and different sites or places of the aircraft.

According to an embodiment, the primary control unit is configured for supplying electrical energy to the first branch.

As described above, the first branch may comprise at least one connection unit which is configured for establishing a wireless connection with the end devices. The first branch and in particular the connection unit may require electrical energy for its operation. The respective electrical energy may be provided by the primary control unit via the first branch. The electrical energy may be provided to the connection unit via the same wires than the control signals and commands or via separate wires in the first branch.

Alternatively, the electrical energy may be provided to the first branch by a separate power source.

In this embodiment, the backup control unit may be configured for taking over supplying electrical energy to the first branch from the primary control unit in case of a failure of the primary control unit.

According to a further embodiment, the data communications network as described above and hereinafter comprises a first group of connection units comprising at least one connection unit which is connected to the first branch and is configured for establishing a wireless data connection to at least one of the end devices from the first group of end devices.

The first group of connection units may comprise one or more connection units, for example so called data concentrators or wireless data concentrators which comprise a first interface being formed as a wireless interface for establishing a connection with one or more end devices and a second interface being formed as a wired interface being formed as a wire-bound interface for connection to the first branch.

According to a further embodiment, the data communications network as described above and hereinafter further comprises a second branch for establishing a wireless data connection to a second group of end devices. The primary control unit is connected to the second branch and is configured for data transmission to and from the second group of end devices via the second branch. The backup control unit is configured for taking over data transmission to and from the second group of end devices from the primary control unit in case of a failure of the primary control unit.

This embodiment of the data communications network further reduces the failure probability as a second group of end devices is connected to the primary control unit (and to the backup control unit in case the backup control unit takes over operation from the primary control unit when the latter fails). Thus, the effect of a failure of the first branch (for example "loss of wire") can be cushioned. There is still a connection available to the second group of end devices. The first and second group of end devices may be separated by a criticality classification. In other words, end devices of a first criticality class may be connected to the first group of connection units and end devices of a second criticality class may be connected to the second group of connection units.

The backup control unit is configured to take over managing the second branch and the interconnected connection units and end devices similar to those of the first branch. Therefore, the respective explanations given above relating to the first branch similarly apply to the second branch.

According to a further embodiment, the primary control unit is configured for supplying electrical energy to the second branch, wherein the backup control unit is configured for taking over supplying electrical energy to the second branch from the primary control unit in case of a failure of the primary control unit.

This is also similar to the first branch as explained above. The primary control unit is configured for managing the first branch and the second branch, thereby providing redundancy of wires (the wires of the first and second branch) such that a failure of the first or second branch can be absorbed. The backup control unit is configured as a redundant system for the primary control unit and is configured similar to the primary control unit. Therefore, redundancy is provided on two hierarchical levels of the data communications network: redundancy of wires by means of the first and second branches and redundancy of control units by providing primary and backup control units.

According to a further embodiment, the primary control unit is configured for data transmission to and from the second group of end devices via the first branch in case of a failure of the second branch.

Thus, the end devices of the second group of end devices receive and transmit data via the first branch, i.e. via the first group of connection units. This may require that the connection units of the first group are located such that all end devices are within a range, in particular within a radio range of the wireless interface of the connection units of the first group of connection units.

This embodiment may further add redundancy to the data communications network as all end devices in the aircraft are able to send data to the primary control unit (and/or to the backup control unit if the backup control unit takes over the function of the primary control unit in the data communications network) in case the second branch fails or the second group of connection units connected to the second branch fail.

According to a further embodiment, the primary control unit is configured for data transmission to and from the first group of end devices via the second branch in case of a failure of the first branch.

This embodiment is complementary to the previous embodiment. It is thus shown that all end devices are accessible to the primary control unit and the backup control unit via either the first branch and the first group of connection units or via the second branch and the second group of connection units.

A data communications network as described above and hereinafter may particularly provide reduced failure probability and may enable designing a data communications network for an aircraft such that redundancy of network components can be provided at different levels (control units, network branches, connection to end devices) such that the effect of a failure of one or more components of the data communications network can effectively be limited or isolated and the data communications network is still functioning.

According to a further aspect, a data communications system for an aircraft is provided. The data communications system comprises a data communications network as described above and hereinafter and a multitude of end devices wirelessly connected to the first branch and configured for transmitting data to the primary control unit.

The end devices can be any kind of data delivery device such as a sensor or data receiving devices such as an actuator or a multimedia unit. The end devices may be separately located within an aircraft inside or outside the fuselage of the aircraft and in the passenger cabin.

According to a further embodiment, the data communications system comprises at least one end device of a first type and at least one end device of a second type, wherein the second type end device comprises an autonomous energy supply unit.

Thus, a distinction can be made between criticality of end devices. More critical end devices can be of the second type and have an autonomous energy supply unit whereas the first type end devices can be connected to a power supply network of the data communications system, for example to a dedicated power supply network of the aircraft or of the data communications network as described above and hereinafter.

The second type end device may thus particularly be configured to still function in case of a loss of power. The data communications network as described above and hereinafter may comprise an autonomous energy supply unit, too. Thus, the second type end device can communicate with the data communications network in case of a (temporary) loss of power.

According to a further embodiment, the second type end device is configured for detecting an operating state of the primary control unit and the backup control unit and to determine whether a data connection to both control units is interrupted.

The data connection from an end device to the primary control unit and to the backup control unit may be interrupted due to different reasons: failure of the connection units, failure of one or both of the first and second branches, failure of the primary control unit and/or the backup control unit. All these reasons can be absorbed by the data communications network as described above. Thus, if after a predetermined period of time the connection to the primary control unit and to the backup control unit cannot be re-established, the second group of end devices is configured for recognising this status.

According to a further embodiment, the second type end device is configured for establishing an ad hoc data connection with another second type end device for transmitting data via the ad hoc data connection.

An ad hoc data connection may be a point to point connection between a first end device of the second type and a second end device of the second type such that direct data transmission can take place between these two devices. Thus, even when the data communications network failed, the data communications system can establish data transmission between the said first and second devices of the second type via the ad hoc data connection. Thus, the failure probability of the data communications system is further reduced.

According to a further aspect, an aircraft comprising a data communications system as described above and hereinafter is provided.

The aircraft may be a passenger aircraft or a cargo plane.

According to a further embodiment, the end devices are sensors configured for determining operational parameters of the aircraft.

The sensors may be located throughout the aircraft and may be independent elements (i.e. the sensors are independent from each other) which are wirelessly interconnected with the data communications network.

Some of the end devices may be actuators, as exemplarily described above or combinations of sensors and actuators.

According to a further embodiment, the first branch and a second branch of the data communications network are arranged in the aircraft such that they are spatially separated.

In the aircraft, the first branch may be arranged at a first lateral wall of the fuselage and the second branch may be arranged at a second lateral wall of the fuselage. In case of a damage of one lateral wall which influences the function of one of the first or second branch, the other one can be used as a redundant element. For example, the first branch may extend longitudinally along the fuselage on the left side and the second branch may extend longitudinally along the fuselage on the right side of the fuselage. A multitude of connection units may be provided at the first and second branches spaced apart from each other along the entire length of the fuselage or partially along the longitudinal direction of the fuselage.

In the following, exemplary embodiments are shown with reference to the drawings.

DETAILED DESCRIPTION OF EXEMPLARY EMBODIMENTS

The drawings are schematic and not to scale. Similar reference signs in the appended drawings relate to similar elements.

Figure 1:
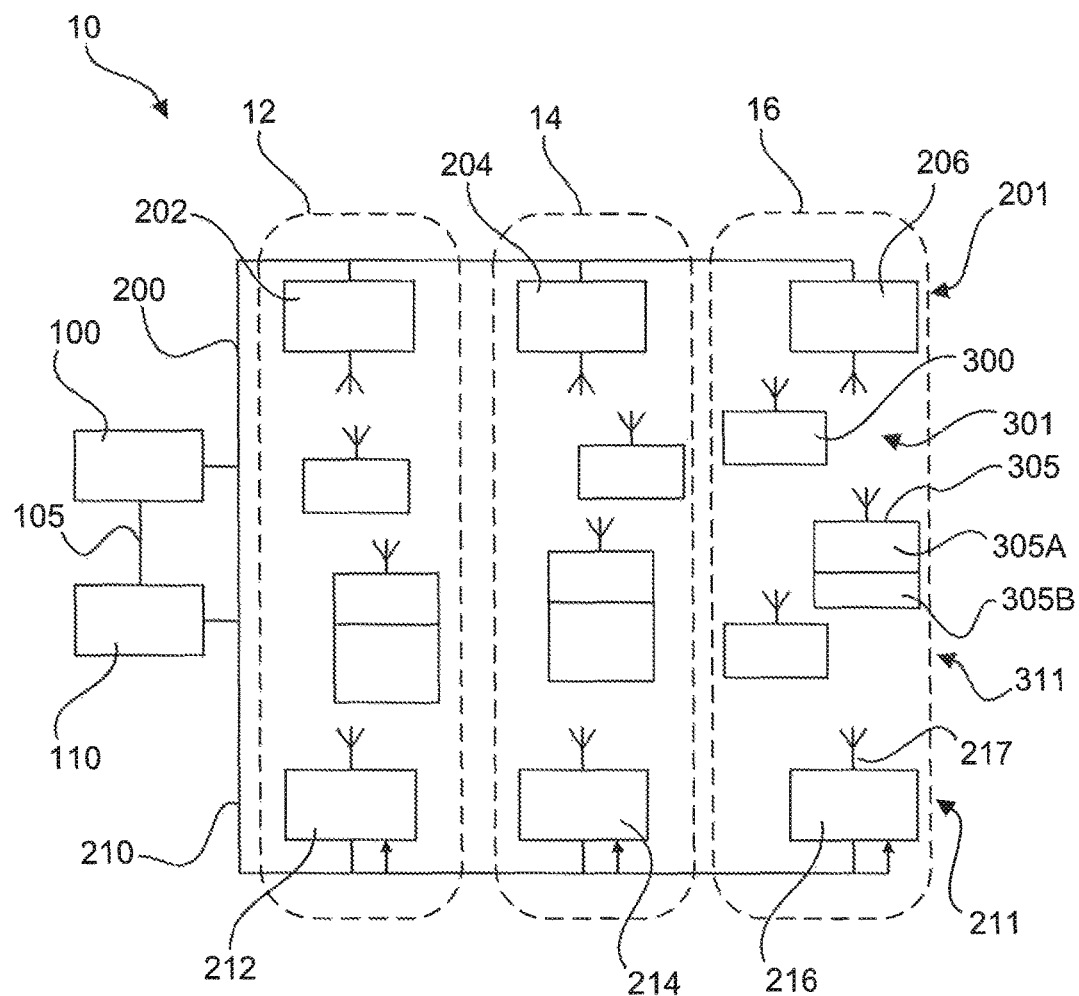
FIG. 1 schematically shows a data communications network according to an exemplary embodiment.

FIG. 1 shows a data communications network 10 wirelessly connected to a multitude of end devices 300, 305. The end devices 300, 305 are arranged such that they are organized in a first group of end devices 301 and a second group of end devices 311.

The data communications network 10 comprises a primary control unit 100 and a backup control unit 110 which are interconnected via a connection element 105. The backup control unit 110 monitors the operating status of the primary control unit 100 via the connection element 105. Both control units 100, 110 are connected to the first branch 200 and the second branch 210.

The first branch 200 is a wired connection between the primary and backup control unit and the first group of connection units 201 with the connection units 202, 204, and 206. The second branch 210 is structured similar to the first branch 200. There is a wired connection from the second group of connection units 211 with the connection units 212, 214, and 216 to the primary control unit 200 and the backup control unit 210.

The first group of end devices 301 is connected to the data communications network via the first group of connection units 201 whereas the second group of end devices 311 is connected to the data communications network via the second group of connection units 211.

It should be noted that end devices from the first group of end devices 301 may be connected to the data communications network via both, the first group of connection units 201 and via the second group of connection units 211. Thus, additional redundancy is provided. For example, data packets could be transmitted from one of the primary or backup control unit to an end device via both branches. This may reduce a packet error rate, as packets are transmitted via two different routes to the end devices. This approach may apply to packets transmitted from the control units to the end devices and to packets transmitted from the end devices to the control units. In the latter case, an end device may particularly transmit a data packet via two connection units one of which is located in the first group of connection units 201 and the other one is located in the second group of connection units 211.

The connection units are configured such that a multitude of cells 12, 14, and 16 are provided, wherein each cell comprises at least one connection unit from the first group of connection units 201 and at least one connection unit from the second group of connection units 311. Every end device is located within one of the cells 12, 14, and 16.

Every connection unit comprises an air interface 217. The air interface is configured for establishing a wireless connection to one or more end devices 300, 305. Every end device comprises an air interface 302 (see FIG. 2), which is a counterpart of the air interface 217 of the connection units.

The end devices can be of a first type 301 or of a second type 305. The first type end devices are connected to an electric power source of the data communications network 10 or of the aircraft whereas the second type end devices 305 comprise an autonomous energy supply unit 305B and a functional unit 305A. Thus, the functional unit 305A can be supplied with electrical energy for a predetermined duration with electrical energy by the energy supply unit 305B.

The data communications network 10 as shown in FIG. 1 enables redundancy at different levels: The backup control unit 110 is configured to take over the function of the primary control unit 100. The primary control unit 100 and the backup control unit 110 are connected to the first branch 200 and to the second branch 210. Both, the first group of connection units 201 and the second group of connection units 211 can access every end device in the cells 12, 14, and 16. Thus, there is redundancy for fail of the primary control unit 100, fail of the first or second branch 200, 210, and fail of a connection unit in one of the cells.

Figure 3:
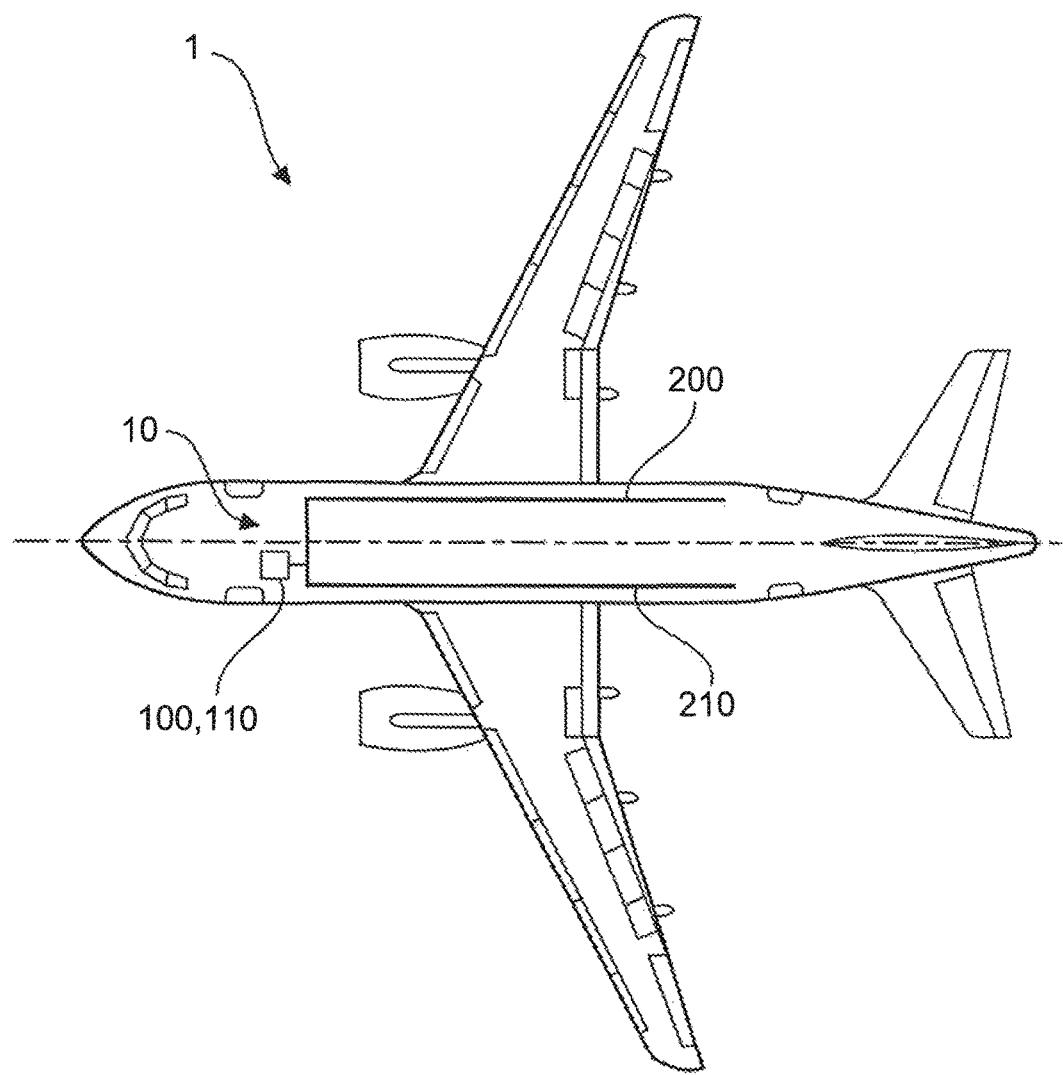
FIG. 3 schematically shows an aircraft with a data communications network according to a further exemplary embodiment.

The first branch 200 may be installed on the left or right side of an aircraft, wherein the second branch 210 will then be installed on the other side of the aircraft, see FIG. 3. The connection units 202, 204, 206, 212, 214, and 216 are arranged longitudinally along the fuselage of the aircraft, for example from front to back of the aircraft along the complete length of the aircraft or along a partial length. Adjacent connection units are spaced apart from each other at a predetermined distance, wherein the distance of the connection units of the second branch and those of the first branch may be the same or different.

The first branch 200 and the second branch 210 are foreseen as independent installation in wires and cable routes. This may apply for power supply lines of the first and second branch and for data wires, i.e. the power supply lines may be separated from the data wires. Thus, any loss of power supply or data wires on one side of the aircraft can be taken over to the other side, i.e. to the other branch of the data communications network.

In case of loss of the primary control unit 100, i.e. the primary wireless control, the backup control unit 110 will take over the function of the primary control unit 110 in the data communications network 10.

Figure 2:
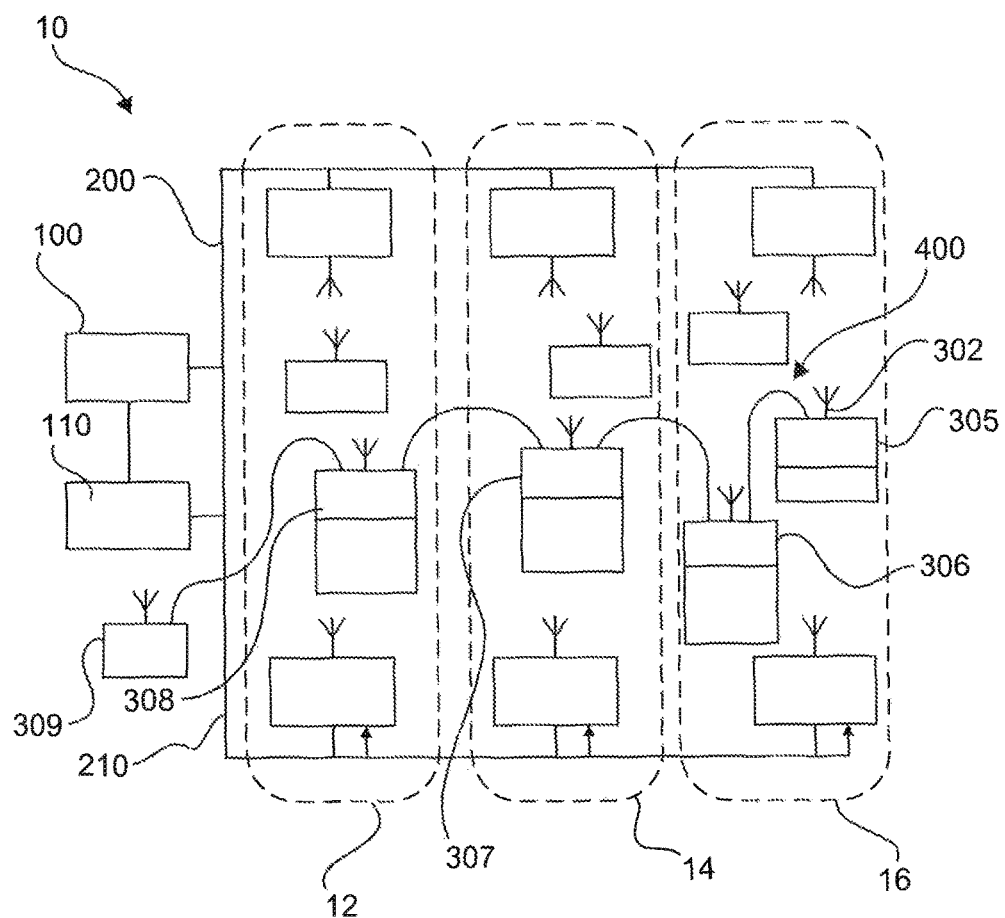
FIG. 2 schematically shows a data communications network according to a further exemplary embodiment.

FIG. 2 shows a data communications network 10 similar to that shown in FIG. 1. The second type end devices 305 comprising an autonomous energy supply unit are configured to establish an ad hoc network 400 having a data connection to at least a part of the other second type end devices with an autonomous energy supply unit.

The ad hoc data network is identified with the connection between the end devices 305, 306, 307, 308, and 309. The end device 309 may collect or receive data from the end devices 305, 306, 307, and 308 and may analyse the received data for further usage in the aircraft.

The second group of end devices may be particularly configured to monitor the data communications network and to recognise if no connection to the data communications network can be established for a predetermined period of time. In this case, the second group of end devices are configured to establish the direct data connection 400 to each other over all cells 12, 14, and 16 of the data communications network.

FIG. 2 particularly shows the case of a loss of the complete data communications network. In this case, the second type end devices will establish a point to point or mesh communication of the wireless end devices. This can be in case of total loss of network function (wireless data concentrators/connection units, first and second branches, and primary control unit and backup control unit) because of aircraft damage. The second group of end devices comprise autonomous energy supply units (for example batteries, energy buffers, and/or energy harvesters) for these cases. Examples of applications with independent power supply are electric window shades by use of thermo harvesters or temperature sensors with batteries. A second source of power supply is the common availability from aircraft power supply sources. Due to the independence of the power circuits between the various applications some end devices may still be supplied with power. The data communications network and data communications system thus provides a flexible choice of mechanisms for redundancy and reducing failure probability. Thus, the data transport availability is improved in case of a lost or damaged cable connection, in case of loss of equipment, i.e. failure of single components.

FIG. 3 shows an aircraft 1 with a data communications network 10 as shown with reference to FIGS. 1 and 2. The end devices may be arranged throughout the interior or exterior of the aircraft. The first and second branches are spatially separated from each other.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 aircraft
10 data communications network
12 first cell
14 second cell
16 third cell
100 primary control unit
105 connection element
110 backup control unit
200 first branch
201 first group of connection units
202 first connection unit
204 second connection unit
206 third connection unit
210 second branch
211 second group of connection units
212 fourth connection unit
214 fifth connection unit
216 sixth connection unit
217 transmit and receive interface
300 first type end device
301 first group of end devices
302 transmit and receive interface
305 second type end device
305A functional unit
305B autonomous energy supply unit
306 second type end device
307 second type end device
308 second type end device
309 managing end device
311 second group of end devices
400 ad hoc data connection

The invention claimed is:
1. A data communications network for an aircraft, the network comprising:
 a first branch for establishing a wireless data connection to a first group of end devices;
 a primary control unit connected to the first branch;
 a backup control unit connected to the first branch;
 a first group of connection units;
 a second group of connection units;

wherein the primary control unit, in an operational state, transmits data to and from the first group of end devices via the first branch, and wherein the backup control unit, in a first operational state, detects an operating state of the primary control unit and, in a second operational state, takes over data transmission to and from the first group of end devices via the first branch from the primary control unit in case of a failure of the primary control unit, a second branch for establishing a wireless data connection to a second group of end devices;

wherein the primary control unit, is connected to the second branch, wherein the primary control unit, in an operational state, transmits data to and from the second group of end devices via the second branch, and wherein the backup control unit, in an operational state, takes over data transmission to and from the second group of end devices from the primary control unit in case of a failure of the primary control unit, wherein the primary control unit, in an operational state, transmits data to and from the second group of end devices via the first branch in case of a failure of the second branch, and wherein the primary control unit, in an operational state, transmitting data to and from the first group of end devices via the second branch in case of a failure of the first branch, wherein the first group of connection units is connected to the first branch and, in an operational state, establishes a wireless data connection to at least one of the end devices from the first group of end devices, wherein the second group of connection units is connected to the second branch and, in an operational state, establishes a wireless data connection to at least one of the end devices from the second group of end devices, wherein the at least one end device from the first group of end devices is connectable to at least one of the primary control unit and the backup control unit via both, the first group of connection units and via the second group of connection units, and wherein the at least one end device from the second group of end devices is connectable to at least one of the primary control unit and the backup control unit via both, the first group of connection units and via the second group of connection units.

2. The data communications network according to claim 1, wherein the primary control unit, in an operational state, supplies electrical energy to the first branch.

3. The data communications network according to claim 2, wherein the backup control unit, in an operational state, takes over supplying electrical energy to the first branch from the primary control unit in case of a failure of the primary control unit.

4. The data communications network according to claim 1,
wherein the primary control unit, in an operational state, supplies electrical energy to the second branch, and
wherein the backup control unit, in an operational state, takes over supplying electrical energy to the second branch from the primary control unit in case of a failure of the primary control unit.

5. A data communications system for an aircraft, comprising:
a data communications network;
wherein the data communications network comprises:

a first branch for establishing a wireless data connection to a first group of end devices;
a primary control unit connected to the first branch;
a backup control unit connected to the first branch;
a first group of connection units;
a second group of connection units;

wherein the primary control unit in an operational state, transmits data to and from the first group of end devices via the first branch, wherein the backup control unit, in a first operational state, detects an operating state of the primary control unit and, in a second operational state, takes over data transmission to and from the first group of end devices via the first branch from the primary control unit in case of a failure of the primary control unit, and wherein the data communications system comprises a multitude of end devices wirelessly connected to the first branch and configured for transmitting data to the primary control unit, a second branch for establishing a wireless data connection to a second group of end devices;

wherein the primary control unit is connected to the second branch, wherein the primary control unit in an operational state, transmits data to and from the second group of end devices via the second branch, and wherein the backup control unit, in an operational state, takes over data transmission to and from the second group of end devices from the primary control unit in case of a failure of the primary control unit, wherein the primary control unit, in an operational state, transmits data to and from the second group of end devices via the first branch in case of a failure of the second branch, and wherein the primary control unit, in an operational state, transmits data to and from the first group of end devices via the second branch in case of a failure of the first branch, wherein the first group of connection units is connected to the first branch and, in an operational state, establishes a wireless data connection to at least one of the end devices from the first group of end devices, wherein the second group of connection units is connected to the second branch and, in an operational state, establishes a wireless data connection to at least one of the end devices from the second group of end devices, wherein the at least one end device from the first group of end devices is connectable to at least one of the primary control unit and the backup control unit via both, the first group of connection units and via the second group of connection units, and wherein the at least one end device from the second group of end devices is connectable to at least one of the primary control unit and the backup control unit via both, the first group of connection units and via the second group of connection units.

6. The data communications system according to claim 5, comprising at least one end device of a first type and at least one end device of a second type;
wherein the second type end device comprises an autonomous energy supply unit.

7. The data communications system according to claim 6, wherein the second type end device, in an operational state, detects an operating state of the primary control unit and the backup control unit and determines whether a data connection to the primary and the backup control units is interrupted.

8. The data communications system according to claim 6, wherein the second type end device, in an operational state, establishes an ad hoc data connection with another second type end device for transmitting data via the ad hoc data connection.

9. An aircraft, comprising a data communications system;
wherein the data communications system comprises a data communications network;
wherein the data communications network comprises:
a first branch for establishing a wireless data connection to a first group of end devices;
a primary control unit connected to the first branch;
a backup control unit connected to the first branch;
a first group of connection units;
a second group of connection units;
wherein the primary control unit, in an operational state, transmits data to and from the first group of end devices via the first branch,
wherein the backup control unit, in a first operational state, detects an operating state of the primary control unit and, in a second operational state, takes over data to and from the first group of end devices via the first branch from the primary control unit in case of a failure of the primary control unit, and
wherein the data communications system comprises a multitude of end devices wirelessly connected to the first branch and configured for transmitting data to the primary control unit,
a second branch for establishing a wireless data connection to a second group of end devices;
wherein the primary control unit is connected to the second branch,
wherein the primary control unit, in an operational state, transmits data to and from the second group of end devices via the second branch, and
wherein the backup control unit, in operational state, takes over data to and from the second group of end devices from the primary control unit in case of a failure of the primary control unit,
wherein the primary control unit, in an operational state, transmits data to and from the second group of end devices via the first branch in case of a failure of the second branch, and
wherein the primary control unit, in an operational state, transmits data to and from the first group of end devices via the second branch in case of a failure of the first branch,
wherein the first group of connection units is connected to the first branch and, in an operational state, establishes a wireless data connection to at least one of the end devices from the first group of end devices,
wherein the second group of connection units is connected to the second branch and, in an operational state, establishes a wireless data connection to at least one of the end devices from the second group of end devices,
wherein the at least one end device from the first group of end devices is connectable to at least one of the primary control unit and the backup control unit via both, the first group of connection units and via the second group of connection units, and
wherein the at least one end device from the second group of end devices is connectable to at least one of the primary control unit and the backup control unit via both, the first group of connection units and via the second group of connection units.

10. The aircraft according to claim 9, wherein the end devices are sensors for determining operational parameters of the aircraft.

11. The aircraft according to claim 9, wherein the first branch and a second branch of the data communications network are arranged in the aircraft such that they are spatially separated.

* * * * *